(12) United States Patent
Kyriakouleas (10) Patent No.: US 11,014,332 B2
(45) Date of Patent: May 25, 2021

(54) KIT FOR FORMING A PANEL AND A METHOD OF FORMING A PANEL

(71) Applicant: Litestone Holdings Pty Limited, Balwyn (AU)

(72) Inventor: Kyri Kyriakouleas, Balwyn (AU)

(73) Assignee: Litestone Holdings Pty Limited, Balwyn (AU)

( * ) Notice: Subject to any disclaimer, the term of this patent is extended or adjusted under 35 U.S.C. 154(b) by 0 days.

(21) Appl. No.: 15/501,743

(22) PCT Filed: Aug. 4, 2015

(86) PCT No.: PCT/AU2015/050436
§ 371 (c)(1),
(2) Date: Feb. 3, 2017

(87) PCT Pub. No.: WO2016/019432
PCT Pub. Date: Feb. 11, 2016

(65) Prior Publication Data
US 2017/0225432 A1    Aug. 10, 2017

(30) Foreign Application Priority Data

Aug. 4, 2014 (AU) ............................... 2014903007
Sep. 12, 2014 (AU) ............................... 2014903647

(51) Int. Cl.
*B32B 7/02* (2019.01)
*E04C 2/26* (2006.01)
(Continued)

(52) U.S. Cl.
CPC ............. *B32B 7/02* (2013.01); *B32B 3/08* (2013.01); *B32B 3/12* (2013.01); *B32B 5/18* (2013.01);
(Continued)

(58) Field of Classification Search
CPC .. B32B 7/02; B32B 3/08; B32B 19/04; B32B 15/20; B32B 9/041; B32B 9/046;
(Continued)

(56) References Cited

U.S. PATENT DOCUMENTS 3,950,202 A     4/1976 Hodges
4,822,661 A *   4/1989 Battaglia ................ A47B 13/08
                                              428/116
(Continued)

FOREIGN PATENT DOCUMENTS

CA    2321445 A1 *  4/2002  ............. B29C 44/12
CN    2935981 Y      8/2007
(Continued)

OTHER PUBLICATIONS

[NPL-1] "Honeycomb Panel—Honeycomb Core's Properties"; Honylite (Aug. 13, 2011), p. 10; <http://www.universalmetaltek.com/pdf/Aluminum-Honeycomb-Panel.pdf>. (Year: 2011).*
(Continued)

*Primary Examiner* — David Sample
*Assistant Examiner* — Donald M Flores, Jr.
(74) *Attorney, Agent, or Firm* — Quarles & Brady LLP (57) ABSTRACT

A kit for forming a panel including a panel component, the panel component including a surface sheet formed from a first material, and a body layer to which the surface sheet is adhered generally parallel to the body layer, wherein the body layer has a thickness greater than a thickness of the surface sheet, the body layer has a density less than a density of the surface sheet, and a separate side edge portion adapted to be adhered along at least one edge of the panel component.

9 Claims, 11 Drawing Sheets

(51) Int. Cl.
*E04F 13/073* (2006.01)
*B32B 5/18* (2006.01)
*B32B 19/04* (2006.01)
*B32B 7/12* (2006.01)
*B32B 9/04* (2006.01)
*E04F 13/14* (2006.01)
*B32B 3/12* (2006.01)
*E04F 13/08* (2006.01)
*B32B 9/00* (2006.01)
*B32B 15/20* (2006.01)
*B32B 3/08* (2006.01)
*E04C 2/288* (2006.01)
*E04C 2/00* (2006.01)

(52) U.S. Cl.
CPC .............. *B32B 7/12* (2013.01); *B32B 9/002* (2013.01); *B32B 9/041* (2013.01); *B32B 9/046* (2013.01); *B32B 15/20* (2013.01); *B32B 19/04* (2013.01); *E04C 2/26* (2013.01); *E04C 2/288* (2013.01); *E04F 13/073* (2013.01); *E04F 13/0875* (2013.01); *E04F 13/144* (2013.01); *B32B 2266/0228* (2013.01); *B32B 2307/3065* (2013.01); *B32B 2307/718* (2013.01); *B32B 2307/72* (2013.01); *B32B 2307/732* (2013.01); *B32B 2607/00* (2013.01); *E04C 2002/008* (2013.01); *Y10T 428/2495* (2015.01)

(58) Field of Classification Search
CPC .. B32B 3/12; B32B 9/002; B32B 7/12; B32B 5/18; B32B 2307/72; B32B 2307/718; B32B 2307/732; B32B 2266/0228; B32B 2607/00; B32B 2307/3065; E04F 13/073; E04F 13/0875; E04F 13/144; E04C 2/26; Y10T 428/2495
See application file for complete search history.

(56) References Cited

U.S. PATENT DOCUMENTS

| | | | |
|---|---|---|---|
| 5,034,256 A | | 7/1991 | Santiso, III et al. |
| 5,375,385 A | * | 12/1994 | Feder ............... B32B 3/14 52/385 |
| 2003/0124269 A1 | * | 7/2003 | Servi ............... B32B 3/12 428/15 |
| 2004/0115415 A1 | * | 6/2004 | Thiele ............... B32B 5/18 428/304.4 |
| 2004/0126557 A1 | * | 7/2004 | Thiele ............... B32B 5/18 428/304.4 |
| 2005/0167027 A1 | | 8/2005 | Lane |
| 2010/0095629 A1 | * | 4/2010 | Taylor ............... E04B 2/08 52/570 |
| 2011/0113716 A1 | | 5/2011 | Guo |
| 2014/0069050 A1 | * | 3/2014 | Bolin ............... E04C 2/26 52/745.21 |
| 2014/0109507 A1 | | 4/2014 | Dossche et al. |
| 2015/0231852 A1 | * | 8/2015 | Kyriakouleas ...... B32B 3/12 428/116 |

FOREIGN PATENT DOCUMENTS

| | | |
|---|---|---|
| CN | 201238810 Y | 5/2009 |
| CN | 103407209 A | 11/2013 |
| DE | 29716322 U1 | 1/1998 |
| EP | 0255795 A2 | 2/1988 |
| EP | 0584041 A1 | 2/1994 |
| NZ | 631800 | 1/2016 |
| WO | 2001054539 A1 | 8/2001 |
| WO | 2005014285 A1 | 2/2005 |
| WO | 2005102696 A1 | 11/2005 |
| WO | WO-2005102696 A1 * | 11/2005 ............... B32B 5/18 |
| WO | 2014036592 A1 | 3/2014 |
| WO | WO-2014108500 A1 * | 7/2014 ............ E04F 13/144 |
| WO | 2016019432 A1 | 2/2016 |

OTHER PUBLICATIONS

[NPL-2] "Density of Various Solids—Some solids and their densities"; The Engineering Tool Box (Sep. 11, 2007); <https://www.engineeringtoolbox.com/density-solids-d_1265.html>. (Year: 2007).*
Ikea; "Buying Guide: Benchtops, Sinks and Taps"; Retrieved from Internet <URL: http://www.ikea.com/ms/en_AU/media/pdf/buying_guides_2013/kitchen/BENCHTOPS_FY13_FINAL.pdf>; Aug. 14, 2013; 16 pages.
Australian Patent Office, International Search Report for International Patent Application No. PCT/SU2015/050436, dated Nov. 2, 2015; 6 pages.
Innovation Patent Examination Report No. 1 issued for Australian Patent Application No. 2015101864, dated Nov. 4, 2016, 5 pages.
Examination Report No. 2 for standard patent application issued for Australian Patent Application No. 2017201495, dated Dec. 15, 2017, 8 pages.
Extended European Search Report issued for European Patent Application No. 15829363.9, dated Jan. 3, 2018, 7 pages.
First Examination Report issued for New Zealand Patent Application No. 631800, dated Oct. 1, 2014, 2 pages.
Further Examination Report issued for New Zealand Patent Application No. 631800, dated Apr. 20, 2016, 2 pages.
First Examination Report issued for New Zealand Patent Application No. 718589, dated Apr. 20, 2016, 2 pages.
First Examination Report issued for New Zealand Patent Application No. 736596, dated Nov. 17, 2017, 2 pages.
"How to specify | Melamine Interior Panelling NZ, Quality Interior Panels," 2012 Prime Panels, URL: https://web.archive.org/web/20140125052505/http://www.primepanels.co.nz/Products/Surfaces/Melamine/How-to-specify/, before Jan. 25, 2013, 2 pages.
Notice of Acceptance issued for New Zealand Patent Application No. 631800, dated Jul. 6, 2016, 1 page.

* cited by examiner

KIT FOR FORMING A PANEL AND A METHOD OF FORMING A PANEL

This application is a U.S. National Stage Application of International Application No. PCT/AU2015/050436, filed Aug. 4, 2015, which claims the benefit of priority to Australian Patent Application No. 2014903007, filed Aug. 4, 2014, and Australian Patent Application No. 2014903647, filed Sep. 12, 2014.

FIELD OF THE INVENTION

The invention relates to a kit for forming a panel and a method of forming a panel. More particularly, but not exclusively, the invention relates to a light-weight panel intended as an alternative to a solid panel of quartz stone, marble or granite.

BACKGROUND OF THE INVENTION

It is known to use solid panels of quartz stone, marble or granite for different purposes such as benchtops and cladding. Such panels are desirable due to their appearance and feel, but are very heavy in weight.

The applicant has identified that the heavy weight of such panels is the cause of many occupational health and safety (OHS) problems/claims, causing injury and even death. The applicant has also identified that the heavy weight of solid panels contributes significantly to the expense in importation, handling and installation of such panels.

Examples of the invention seek to provide an improved panel which overcomes or at least alleviates disadvantages associated with existing solid panels.

SUMMARY OF THE INVENTION

In accordance with one aspect of the present invention, there is provided a kit for forming a panel including a panel component, the panel component including a surface sheet formed from a first material, and a body layer to which the surface sheet is adhered generally parallel to the body layer, wherein the body layer has a thickness greater than a thickness of the surface sheet, the body layer has a density less than a density of the surface sheet, and a separate side edge portion adapted to be adhered along at least one edge of the panel component.

Preferably, the side edge portion is formed of the first material.

Preferably, the first material is quartz stone, marble or granite, and the panel component is a lightweight replica of a solid panel formed of the first material.

In a preferred form, the surface sheet is formed by slicing the surface sheet from a block of said first material.

Preferably, the surface sheet is formed by running the block through a multi-blade slicer to simultaneously divide the block into a plurality of like slices, each slice being suitable for use as a surface sheet for a panel.

Preferably, the body layer is formed such that a majority of the volume of the body layer is void space.

In a preferred form, the body layer is formed of foam material.

In one form, the surface sheet is adhered to one surface of the body layer, and a plate is adhered to an opposite surface of the body layer.

Preferably, an inner surface of the side edge portion is recessed to accommodate an edge of the surface sheet.

It is preferred that the panel component includes a pair of opposed parallel side edges formed of the first material, the parallel side edges being fixed in place relative to the surface sheet such that the panel component has a substantially constant cross section of the first material formed by the surface sheet and parallel side edges, and wherein the recess of the side edge portion is configured to accommodate said cross section at an edge of the surface sheet and parallel side edges.

Preferably, the recess is substantially planar in a plane perpendicular to the surface sheet and the parallel side edges.

Preferably, the kit includes a completed panel with a side edge portion already adhered to the panel component and the separate side edge portion is a spare side edge portion to facilitate resizing of the completed panel. The completed panel may be customised in dimensions and/or materials to a particular order made by a customer.

In accordance with another aspect of the invention, there is provided a method of forming a panel including the steps of: using a kit as described above; cutting the panel component to a dimension to suit to expose an edge of the panel component; and adhering the side edge portion to said exposed edge of the panel component.

Preferably, the step of adhering the side edge portion includes aligning a recess of the side edge portion to cap an edge of the surface sheet.

More preferably, the step of adhering the side edge portion includes aligning the recess of the side edge portion to cap the edge of the surface sheet and edges of parallel sides of the panel component.

In a preferred form, the step of cutting the panel component includes the step of cutting a straight edge across the surface sheet and parallel side edges of the panel component.

In one example, there is provided a panel including a surface sheet formed from a first material, and a body layer to which the surface sheet is adhered generally parallel to the body layer, wherein the body layer has a thickness greater than a thickness of the surface sheet, the body layer has a density less than a density of the surface sheet, and wherein the panel includes a side edge portion adhered along at least one edge of the panel.

Preferably, the side edge portion is formed of the first material.

In a preferred form, the first material is quartz stone, marble or granite, and the panel is a lightweight replica of a solid panel formed of the first material.

Preferably, the surface sheet is formed by slicing the surface sheet from a block of said first material. More preferably, the surface sheet is formed by running the block through a multi-blade slicer to simultaneously divide the block into a plurality of like slices, each slice being suitable for use as a surface sheet for a panel.

Preferably, the body layer is formed such that a majority of the volume of the body layer is void space.

Preferably, the body layer is formed with a honeycomb structure. More preferably, tube elements of the honeycomb structure run generally transverse to a plane of the panel.

In one example, the body layer is formed from aluminium. Alternatively, the body layer may be formed of foam. The foam may be polystyrene material of a strength sufficient to resist being squashed under normal usage conditions of the panel. The foam may be fire-retardant foam.

Preferably, the surface sheet is adhered to one surface of the body layer, and a plate is adhered to an opposite surface of the body layer.

In a preferred form, the surface sheet is adhered to the body layer with glue, and the plate is adhered to the body layer with glue.

In one example, the side edge portion surrounds an entire edge perimeter of the panel.

In one form, the panel is rectangular, and the side edge portion surrounds all four edges of the panel.

Preferably, the side edge portion forms a mitre joint with the surface sheet.

In another example, there is provided a method of forming a panel including the steps of: slicing a block of a first material to form a slice of said first material; using the slice as a surface sheet of the panel; providing a body layer having a thickness greater than a thickness of the surface sheet, and a density less than a density of the surface sheet; adhering the surface sheet to the body layer with the surface sheet and the body layer generally parallel; and adhering a side edge portion along at least one edge of the panel.

BRIEF DESCRIPTION OF THE DRAWINGS

The invention is described, by way of non-limiting example only, with reference to the accompanying drawings, in which.

DETAILED DESCRIPTION

With reference to FIGS. 1 to 6, there is shown a panel 10 and a method of forming the panel 10. Advantageously, the panel 10 comprises a composite structure which enables the panel 10 to be formed with a much lighter weight than a comparable solid panel. Also, the composite panel maintains a high degree of strength while reducing cost significantly. The composite panel may be formed to look identical to a solid panel made of the same material (for example quartz stone, marble or granite) such that the difference in visual appearance is not detectable.

More specifically, the panel 10 includes a surface sheet 12 formed from a first material, and a body layer 14 to which the surface sheet 12 is adhered, with the surface sheet 12 generally parallel to the body layer 14. The body layer 14 has a thickness greater than a thickness of the surface sheet 12 (as depicted by the relative dimensions in FIG. 4), and the body layer 14 has a density less than a density of the surface sheet 12. The panel 10 includes a side edge portion 16 adhered along at least one edge of the panel 10.

The body layer 14 may have a length and width slightly less than a length and width of the surface sheet 12 to accommodate the side edge portion 16 around the edges of the panel 10. Once the side edge portion 16 is adhered to the body layer 14, the finished panel 10 has an appearance identical to (or at least substantially similar to) a solid panel. For example, in the panel 10 shown in FIG. 6, the first material is quartz stone, and both the surface sheet 12 and the side edge portion 16 are formed of this first material. The finished panel 10 looks identical to a solid quartz stone panel, but is significantly lighter, more cost effective, and safer to work with.

In alternative forms, the first material may be marble or granite, such that the panel 10 would form a lightweight replica of a solid panel formed from marble or granite respectively.

Figure 1:
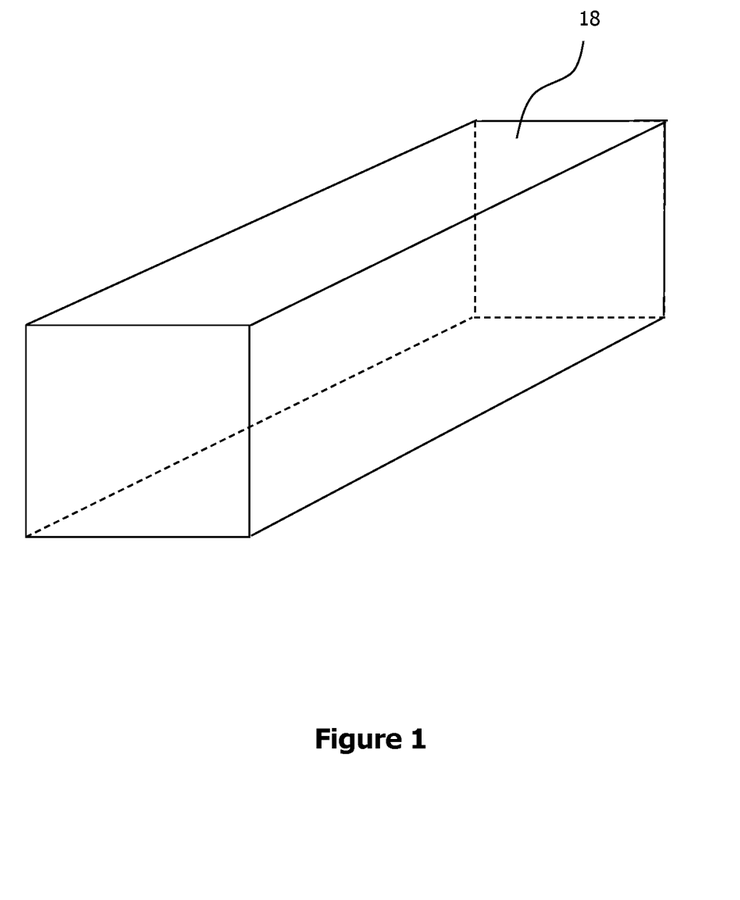
FIG. 1 shows a first step in forming a panel in accordance with an example of the present invention.
Figure 2A:
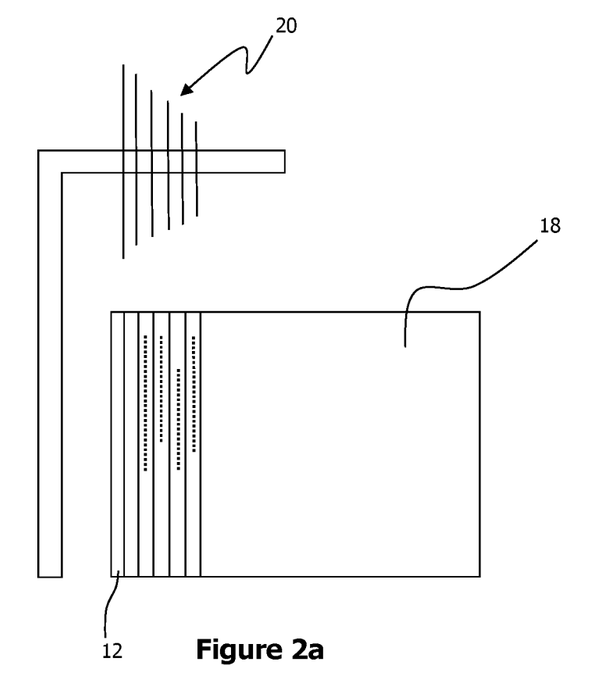
FIG. 2 shows a second step in forming the panel.
Figure 2B:
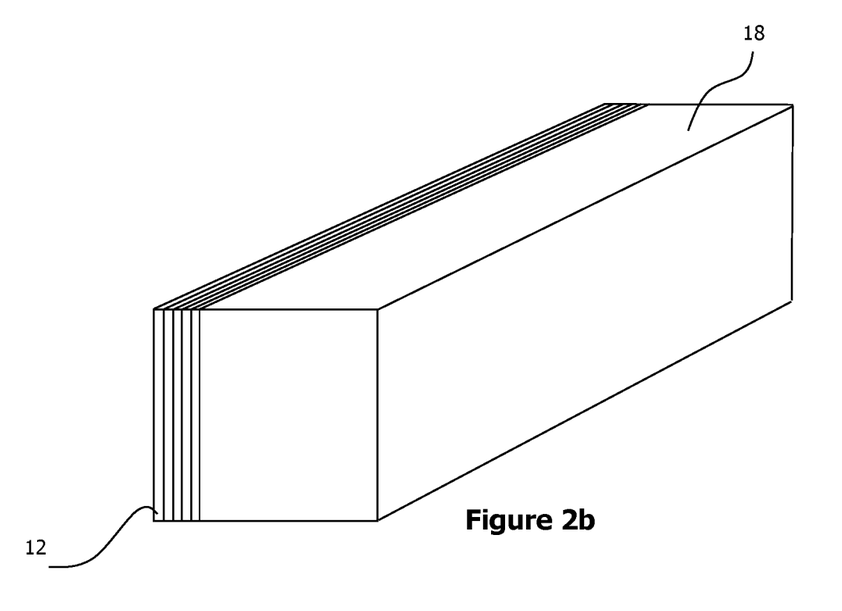

The surface sheet 12 is formed by slicing the surface sheet 12 from a block 18 of the first material. The block 18 is shown in FIG. 1, the slicing operation is shown in FIG. 2a, and the sliced block 18 is shown in FIG. 2b. As shown in FIG. 2a, the block 18 is passed relative to a multi-blade slicer to simultaneously divide the block 18 into a plurality of like slicers, each slice being suitable for use as a surface sheet 12 for a respective panel 10, such that a plurality of panels can be formed from the single block 18. The single block may have a weight in the order of 20 to 30 tonnes. The block 18 may be manufactured from reconstituted stone to form the quartz stone block, or in the case of marble or granite would be quarried. The block may be, for example, 1400 mm in height, 1200 mm in width and 3000 mm in length, although these dimensions could be varied to suit according to the dimensions of the panels to be formed.

FIG. 2a shows the multi-blade slicer 20 having six blades such that six slices are formed simultaneously from the block 18. The blades are spaced at a distance of 5 mm such that each of the surface sheets 12 has a thickness of 5 mm. FIG. 2a shows the block 18 in end view being passed through relative to the multi-blade slicer 20, and FIG. 2b shows a perspective view of the partially sliced block 18.

Figure 3:
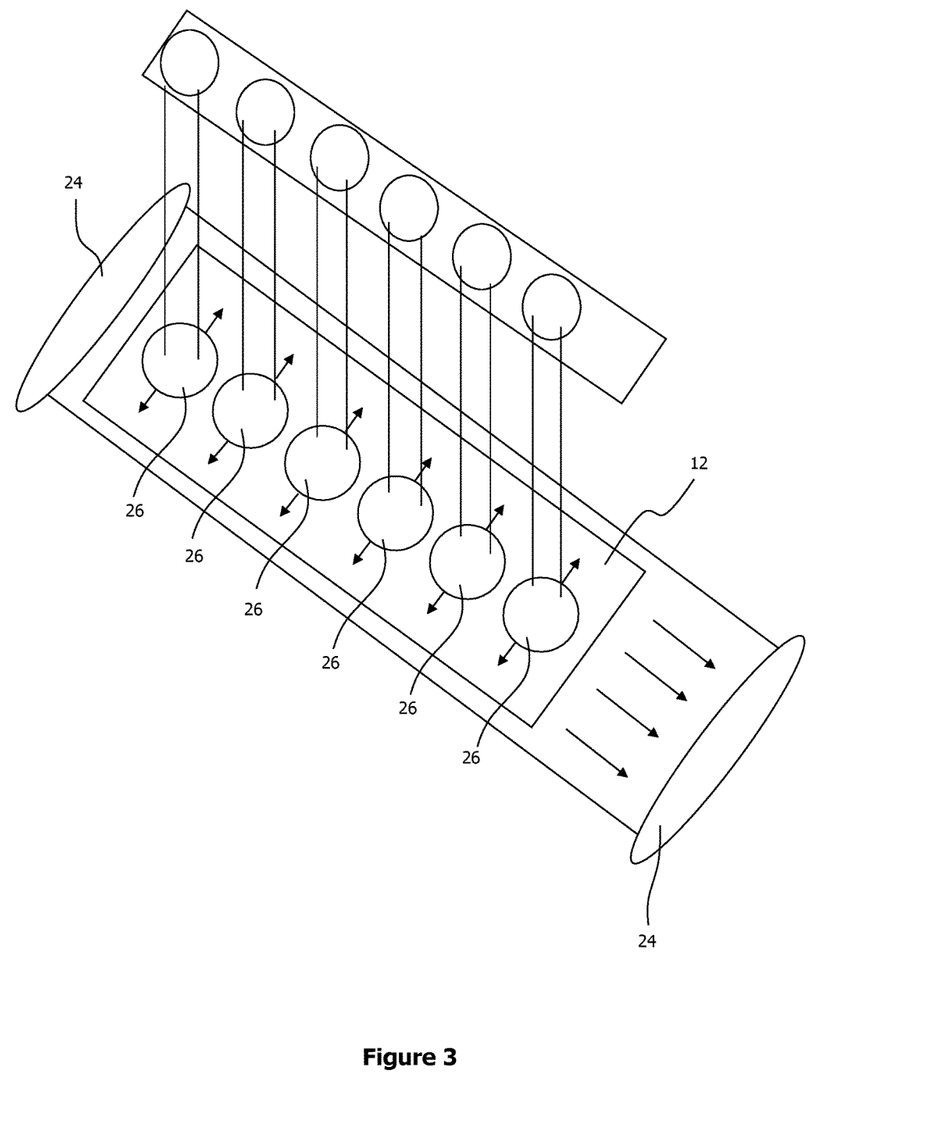
FIG. 3 shows a third step in forming the panel.

With reference to FIG. 3, the 5 mm thick surface sheet 12 is then polished using a multi-head automatic polishing line, on a conveyor belt system 22. The conveyor belt system 22 may have rollers 24, and the polishing heads 26 may have polishing pads which move at a 90 degree angle transverse to the direction of the conveyor belt system 22 as the surface sheet 12 is fed along the conveyor belt system 22.

Figure 4:
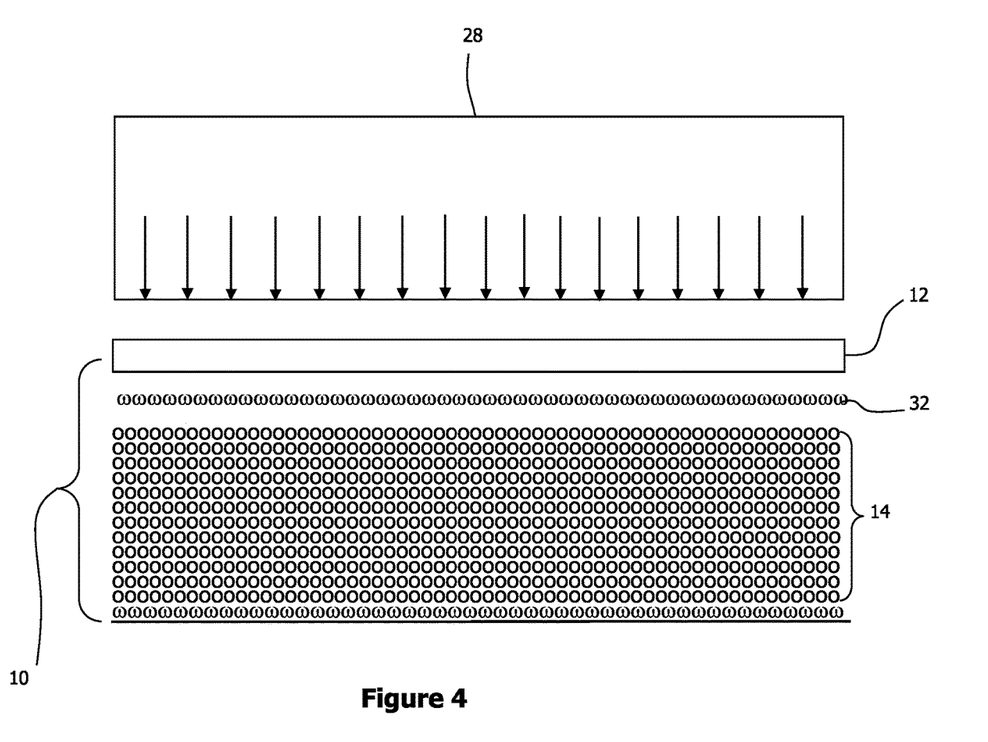
FIG. 4 shows a fourth step in forming the panel.

With reference to FIG. 4, pressure is applied evenly by way of a pressure application device 28 to compress together the different components of the panel 10. More specifically, the different components of the panel 10 include the surface sheet 12, the body layer 14, a plate 30, glue 32 applied between the body layer 14 and the surface sheet 12, and glue 34 applied between the body layer 14 and the plate 30. The body layer 14 may be formed such that a majority of the volume of the body layer 14 is void space. This may be achieved by forming the body layer 14 with a honeycomb structure. For strength purposes, tube elements of the honeycomb structure may be oriented to run generally transverse to a plane of the panel 10. In this way, where the panel 10 is to be used a benchtop, the tube elements of the honeycomb structure will run vertically such that the panel has a high degree of vertical strength. The body layer 14 may be formed of aluminium, however in alternative examples other materials may be used. As shown in FIG. 4, the surface sheet 12 is adhered to one surface of the body layer 14, and the plate 30 is adhered to an opposite side of the body layer 14. The layers of glue 32, 34 may be in the form of epoxy adhesives. In an alternative example, the body layer 14 may be formed of foam, and the foam may be polystyrene material of a commercial strength sufficient to resist being squashed under normal usage conditions of the panel 10. The foam may be fire-retardant foam. It is envisaged that the usage of foam may be advantageous for cost reasons, for lightness and/or for country-specific requirements.

Figure 5:
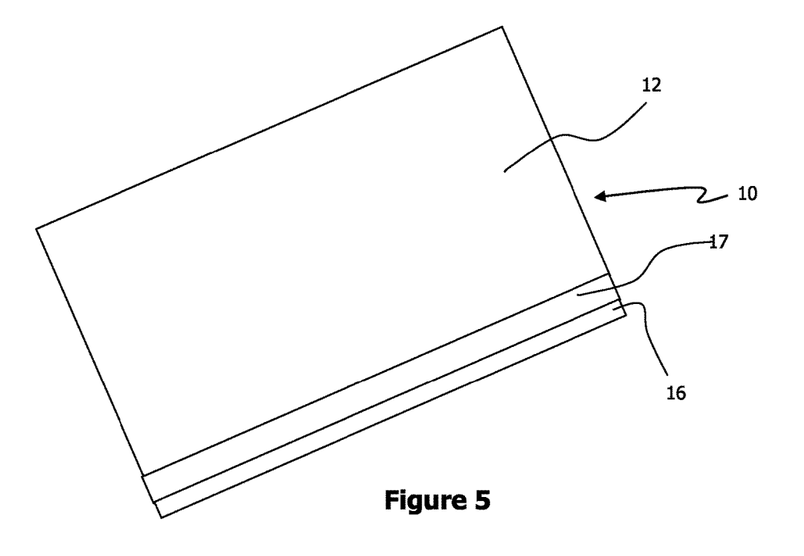
FIG. 5 shows a fifth step in forming the panel.
Figure 6:
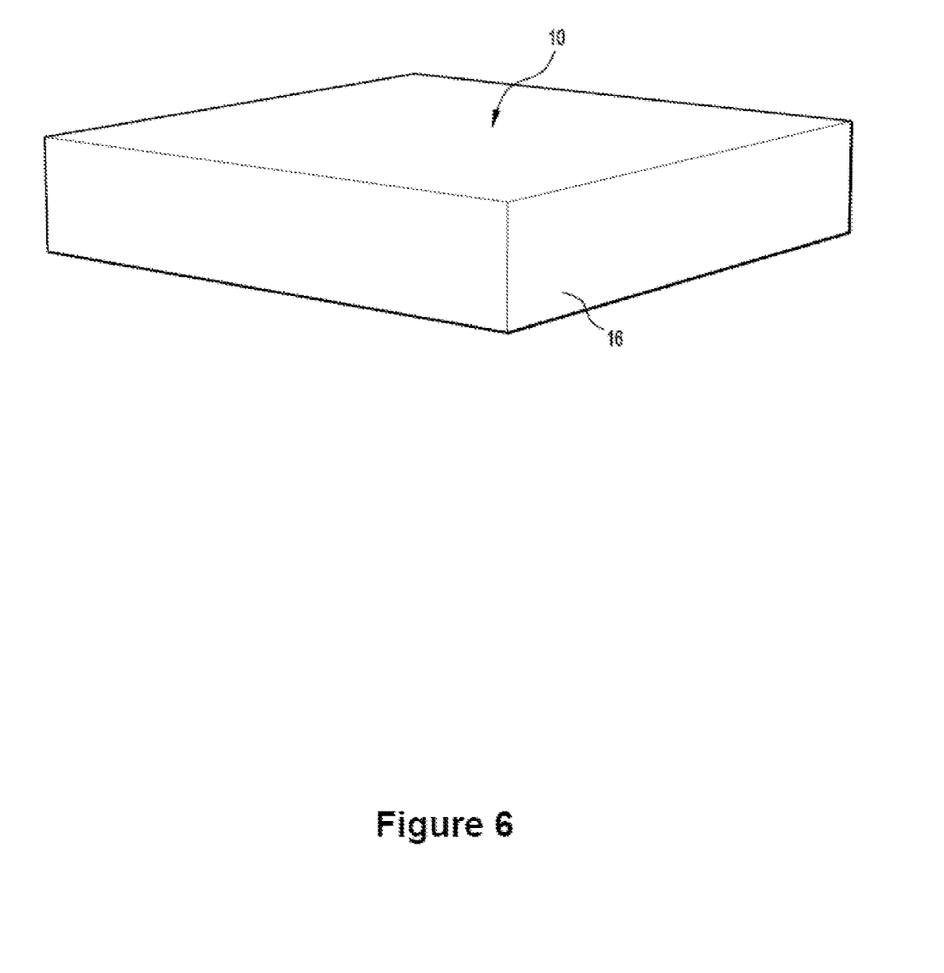
FIG. 6 shows a completed panel.
Figure 7:
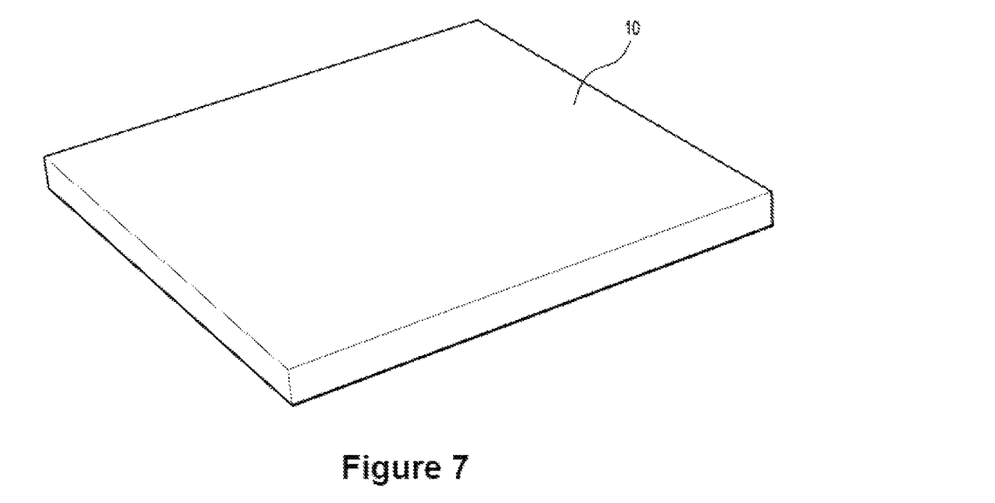
FIGS. 7 to 18 show detail of a kit for forming a panel in accordance with another example of the present invention.
Figure 8:
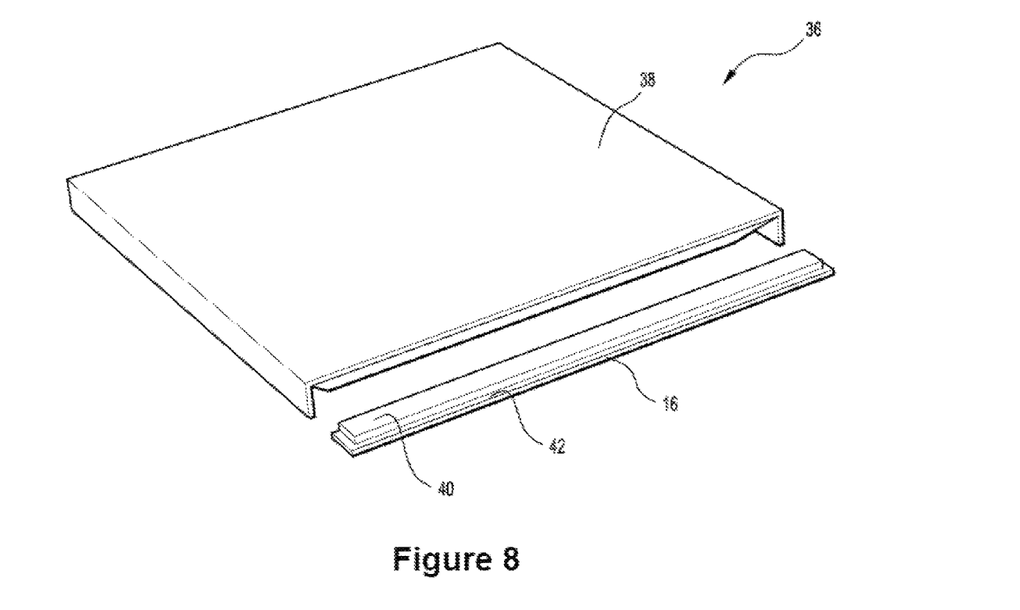
Figure 9:
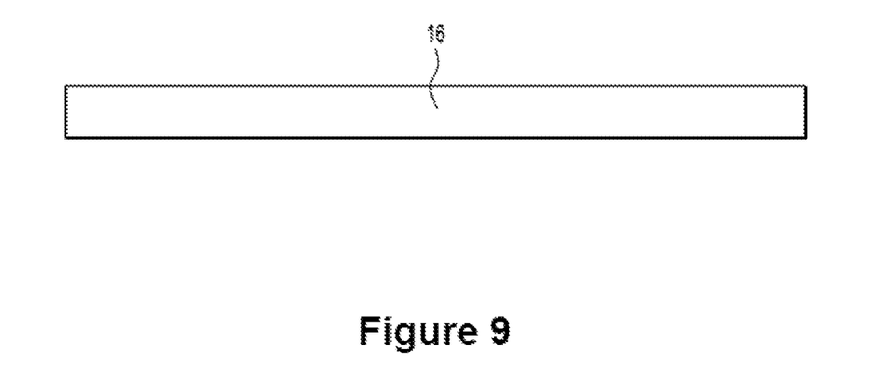
Figure 10:
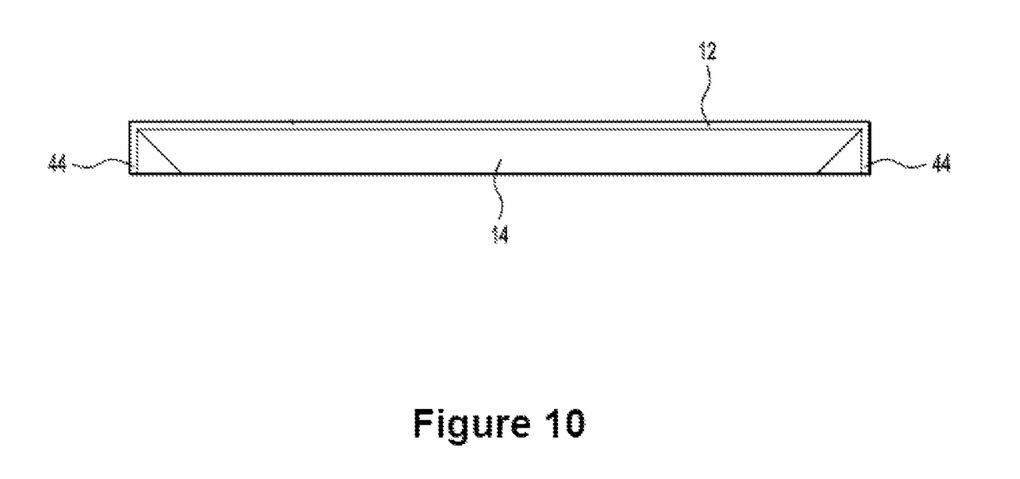
Figure 11:
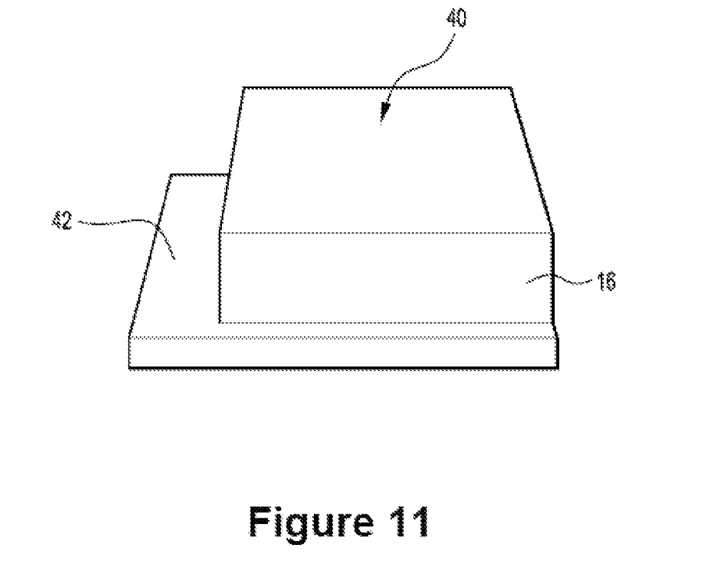
Figure 12:
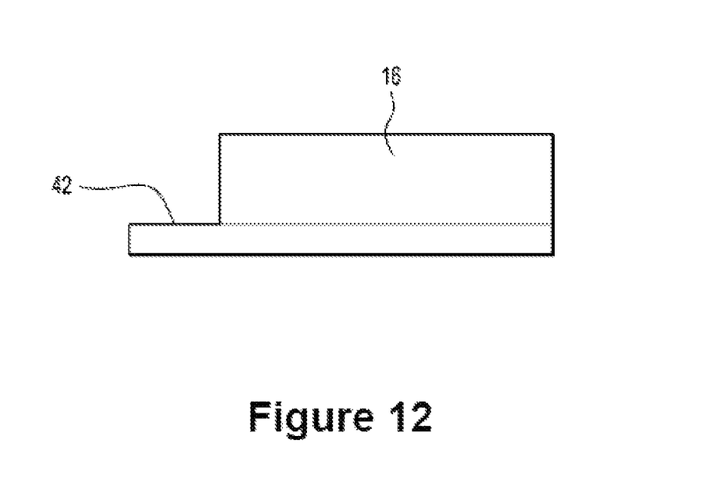
Figure 13:
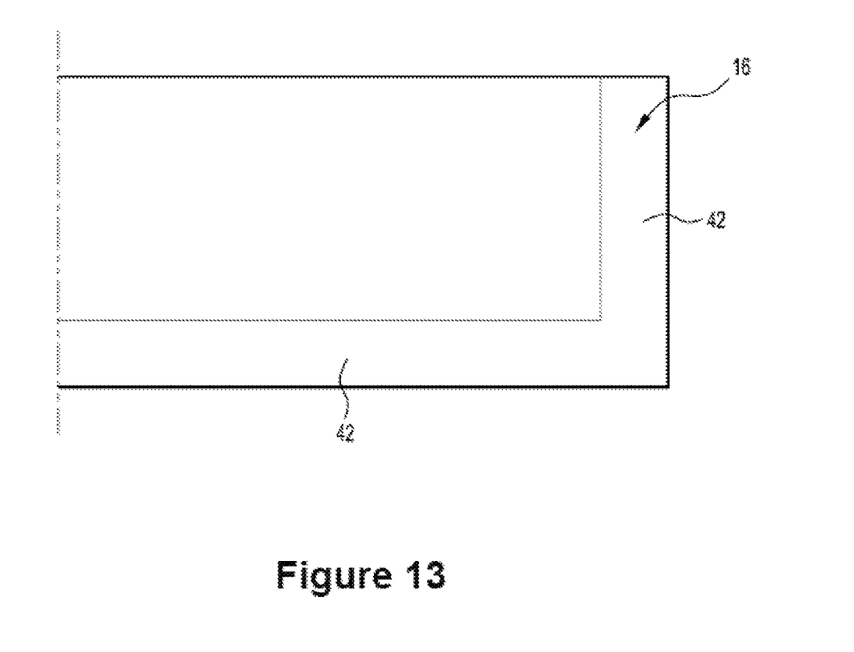
Figure 14:
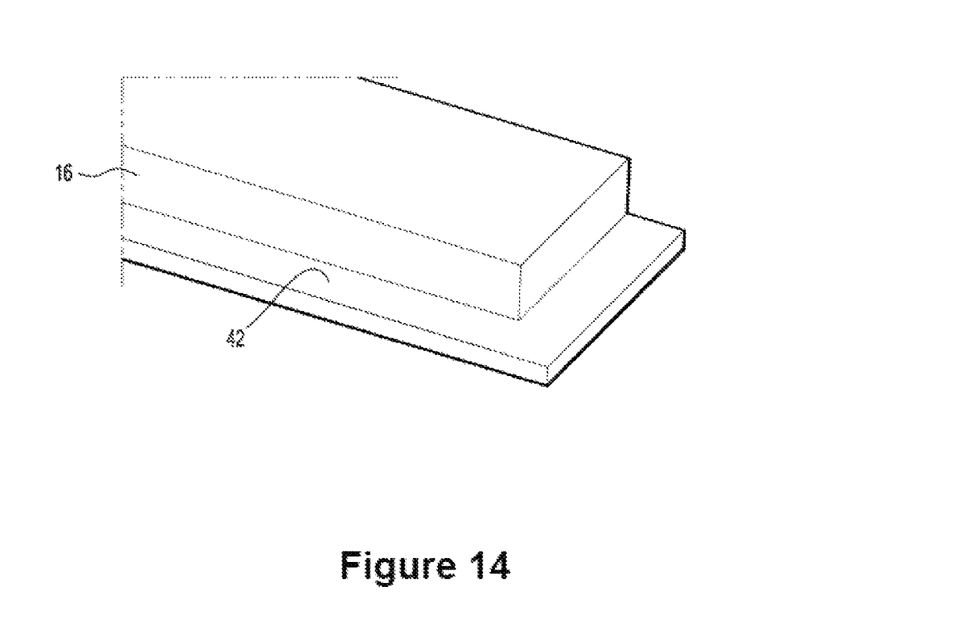

With reference to FIG. 5, the side edge portion 16 is applied to the edge of the panel 10, and may be applied so as to surround an entire edge perimeter of the panel 10. In the example shown, the panel 10 is rectangular, and the side edge portion 16 surrounds all four edges of the panel 10. The side edge portion 16 and the surface sheet 12 are mitred at 45 degrees (at location 17, not to scale) and are glued together so as to form a mitre joint. The side edge portion 16 may have a thickness of 5 mm, and may be cut from one of the slices formed during the slicing step depicted in FIG. 2a.

The plate 30 may be in the form of an aluminium plate. It will be understood that although specific materials are mentioned in the above detailed description, in alternative examples different materials may be used.

Advantageously, as the body layer has a thickness greater than a thickness of the surface sheet 12 and a density less than a density of the surface sheet 12, the finished panel 10 is lighter in weight than a solid panel made of the same material as the surface sheet 12. Also, as the body layer 14 is concealed by the surface sheet 12 and the side edge portion 16, the visual appearance of the panel 10 is the same as for a solid panel of the same material as the surface sheet 12. In some applications, the plate 30 will not be visible; in other examples where the base of the panel 10 will be visible, the bottom surface of the panel 10 may be covered with a surface sheet similar to surface sheet 12, such that the panel 10 has opposed surface sheets 12 formed of the first material. Accordingly, with opposed surface sheets 12 together with a side edge portion 16 extending around the total perimeter of the panel 10, the body layer 14 may be completely concealed from external view during normal use of the panel 10.

With reference to FIGS. 7 to 18, there is shown detail of a kit 36 for forming a panel 10 in accordance with another example of the present invention. Some of the features of the example shown in FIGS. 7 to 18 are similar to the features of the example shown in FIGS. 1 to 6, and like features are shown with like reference numerals.

More specifically, in FIGS. 7 to 18 there is shown a kit 36 for forming a panel 10 including a panel component 38 and a separate side edge portion 16. The side edge portion 16 is recessed such that the panel component 38 can be cut to a desired size, and the recessed side edge portion 16 is able to be adhered to the side edge of the panel component 38 which is exposed during the cutting operation. The recessing of the side edge portion 16 is arranged to cap the cut edges of the parts of the panel component 38 formed of the first material.

The panel component 38 includes a surface sheet 12 formed from the first material, and a body layer 14 to which the surface sheet 12 is adhered generally parallel to the body layer 14. The body layer 14 has a thickness greater than a thickness of the surface sheet 12, and the body layer 14 has a density less than a density of the surface sheet 12. The separate side edge portion 16 is adapted to be adhered along at least one edge of the panel component 38.

Figure 15:
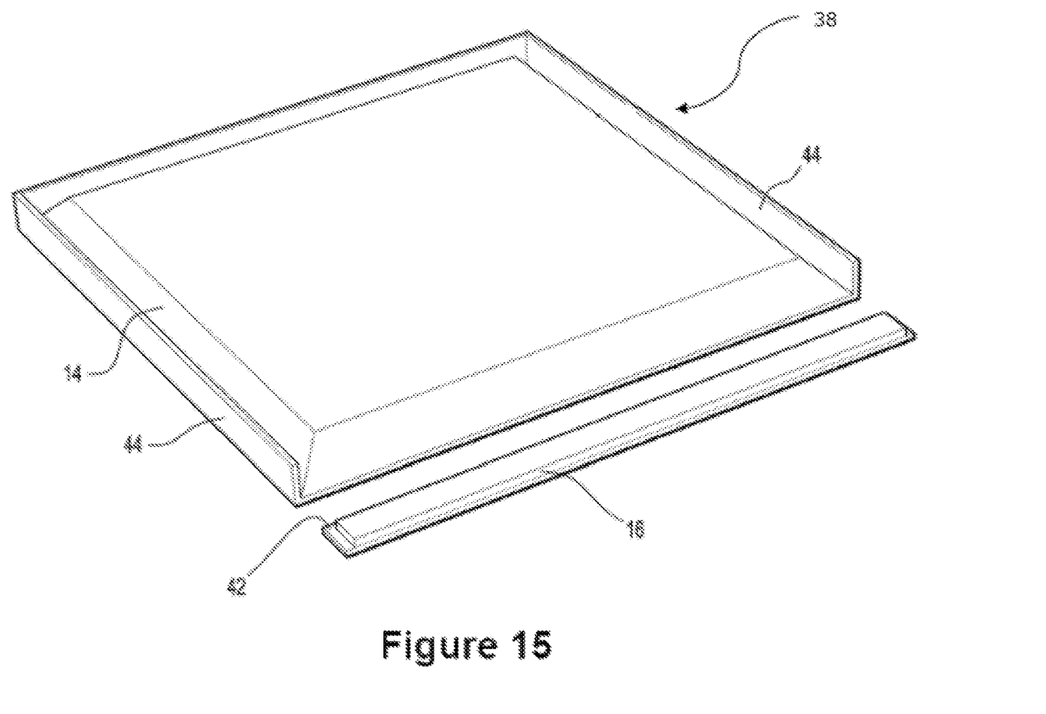
Figure 16:
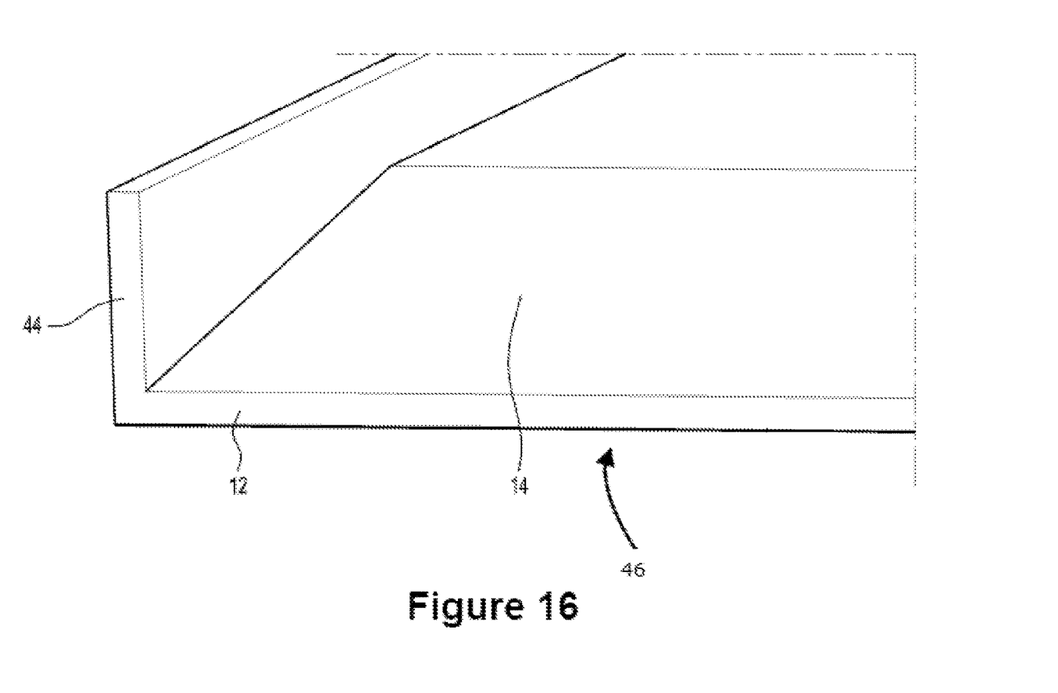
Figure 17:
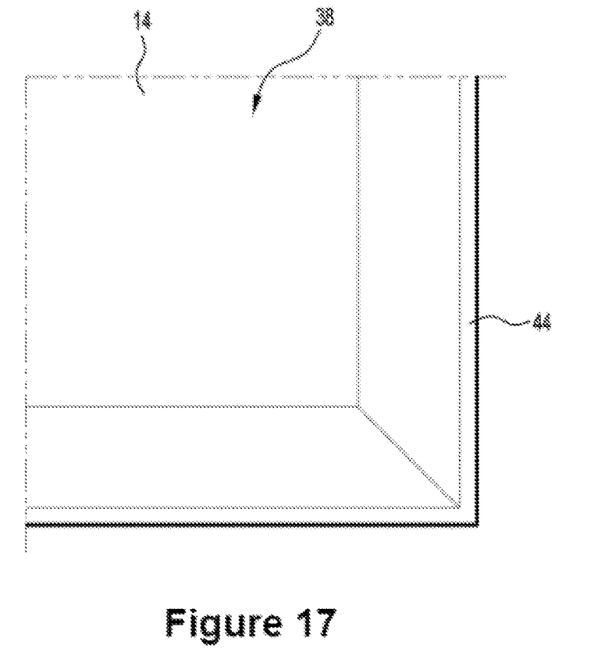
Figure 18:
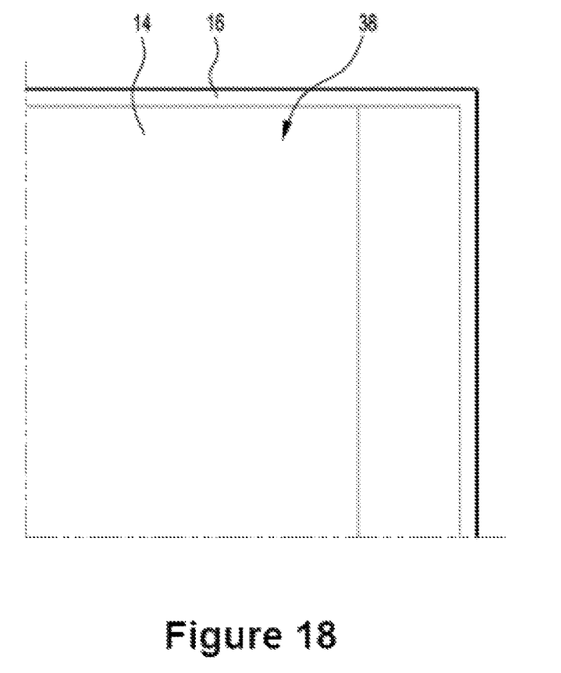

Although FIG. 15 shows the body layer 14 having chamfered edges such that there is a channel between the body layer 14 and the side edges 44, in other examples the body layer 14 may extend right to the side edges 44 without any chamfering or any channel between the body layer 14 and the side edges 44. The material of the body layer 14 may be foam or a different lightweight material. The material of the body layer 14 may be the same colour as the stone being emulated by the panel.

The side edge portion is formed of the first material. The first material may be quartz stone, marble or granite, and the panel 10 may be in the form of a lightweight replica of a solid panel formed of the first material.

The body layer 14 may be formed such that a majority of the volume of the body layer 14 is void space. More specifically, in a preferred form, the body layer 14 is formed of foam material. The surface sheet 12 is adhered to one surface of the body layer 14, and a plate may be adhered to an opposite surface of the body layer 14.

An inner surface 40 of the side edge portion 16 is recessed to accommodate an edge of the surface sheet 12. The panel component 38 includes a pair of opposed parallel side edges 44 formed of the first material, the parallel side edges being fixed in place relative to the surface sheet 12 such that the panel component 38 has a substantially constant cross section 46 of the first material formed by the surface sheet 12 and the parallel side edges 44. The recess 42 of the side edge portion 16 is configured to accommodate the cross section 46 at an edge of the surface sheet 12 and parallel side edges 44.

The recess 42 may be substantially planar in a plane perpendicular to the surface sheet 12 and the parallel side edges 44.

A method of forming a panel 10 includes the steps of: using a kit 36 as described above; cutting the panel component 38 to a dimension to suit to expose an edge of the panel component 38; and adhering the side edge portion 16 to the exposed edge of the panel component 38.

The step of adhering the side edge portion 16 may include aligning a recess 42 of the side edge portion 16 to cap an edge of the surface sheet 12. More specifically, the step of adhering the side edge portion 16 may include aligning the recess 42 of the side edge portion 16 to cap the edge of the surface sheet 12 and edges of parallel sides 44 of the panel component 38.

The step of cutting the panel component 38 may include the step of cutting a straight edge across the surface sheet 12 and parallel side edges 44 of the panel component 38.

In alternatives, the separate side edge portion 16 may be arranged to be fitted around an entire perimeter of the panel component 38. In the case of a rectangular panel component 38, the separate side edge portion 16 may be arranged to be fitted around all four side edges of the panel component 38. The kit 36 may include the panel component 38 already having side edge portions of the first material fitted to all side edges of the panel component 38 such that the panel 10 resembles a solid panel, with the addition of a spare side edge panel 16 in case the user chooses to resize the panel 10. In another form, two spare rebated/recessed side edge portions may be provided in case the user would like to resize the panel 10 in two directions. If the panel 10 is to form an island bench, for example in a kitchen, all four side edges of the panel 10 must be finished in said first material such that the panel 10 resembles a solid panel of the first material. Otherwise, if the panel 10 is to be mounted against a wall or other surface, the edge which abuts the wall may be finished without an edge capping (or side edge portion).

The kit according to the present invention allows a user to easily resize a marble (or other material) look panel to suit and may therefore be used as a do-it-yourself type product which could be sold from a hardware outlet to enable a person to fit their own kitchen benchtop, or the like. The low density foam body layer 14 facilitates cutting of the panel 10 which provides a special working inter-relationship with the re-sizing of the panel provided by the separate side edge portion 16. The low density foam body layer 14 also facilitates cutting the panel 10 for other reasons such as, for example, cutting the panel 10 to fit a basin or other component. Although the kit may be used as a do-it-yourself product, the finished panel may also be produced as a customised product which may be specified by a customer, for example a cabinet maker.

While various embodiments of the present invention have been described above, it should be understood that they have been presented by way of example only, and not by way of limitation. It will be apparent to a person skilled in the relevant art that various changes in form and detail can be made therein without departing from the spirit and scope of the invention. Thus, the present invention should not be limited by any of the above described exemplary embodiments.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The invention claimed is:

1. A kit for forming a lightweight replica stone benchtop/countertop in a do-it-yourself manner, the kit including a panel component,
   the panel component including a surface sheet formed from a first stone material, and a body layer to which the surface sheet is adhered generally parallel to the body layer, wherein the body layer has a thickness greater than a thickness of the surface sheet, the body layer has a density less than a density of the surface sheet, and
   a separate side edge portion existing as an item separate to the panel component, adapted to be adhered along at least one edge of the panel component,
   wherein the panel component with the side edge portion adhered thereto forms a lightweight replica benchtop/countertop which resembles a solid stone benchtop/countertop,
   wherein the panel component is configured to be cut to size in a do-it-yourself manner,
   wherein the panel component further includes a pair of opposed parallel side edges formed of the first material, the parallel side edges being fixed in place relative to the surface sheet such that the panel component has a substantially constant cross-section of the first material formed by the surface sheet and parallel side edges, and
   wherein a recess of the side edge portion is configured to accommodate said cross-section at an edge of the surface sheet and parallel side edges, the recess being substantially planar in a plane perpendicular to the surface sheet and the parallel side edges.

2. The kit for forming the lightweight replica stone benchtop/countertop as claimed in claim 1, wherein the side edge portion is formed of the first material.

3. The kit for forming the lightweight replica stone benchtop/countertop as claimed in claim 1, wherein the first material is quartz stone, marble or granite, and the panel component is a lightweight replica of a solid panel formed of the first material.

4. The kit for forming the lightweight replica stone benchtop/countertop as claimed in claim 1, wherein the surface sheet is formed by slicing the surface sheet from a block of said first material.

5. The kit for forming the lightweight replica stone benchtop/countertop as claimed in claim 4, wherein the surface sheet is formed by running the block through a multi-blade slicer to simultaneously divide the block into a plurality of like slices, each slice being suitable for use as the surface sheet for the panel component.

6. The kit for forming the lightweight replica stone benchtop/countertop as claimed in claim 1, wherein the body layer is formed such that a majority of the volume of the body layer is void space.

7. The kit for forming the lightweight replica stone benchtop/countertop as claimed in claim 1, wherein the body layer is formed of foam material.

8. The kit for forming the lightweight replica stone benchtop/countertop as claimed in claim 1, wherein the surface sheet is adhered to one surface of the body layer, and a plate is adhered to an opposite surface of the body layer.

9. The kit for forming the lightweight replica stone benchtop/countertop as claimed in claim 1, wherein the recess that accommodates the edge of the surface sheet is on an inner surface of the side edge portion.

* * * * *